No. 817,204. PATENTED APR. 10, 1906.
B. E. THOMPSON.
FASTENER FOR FENDERS.
APPLICATION FILED JULY 22, 1905.
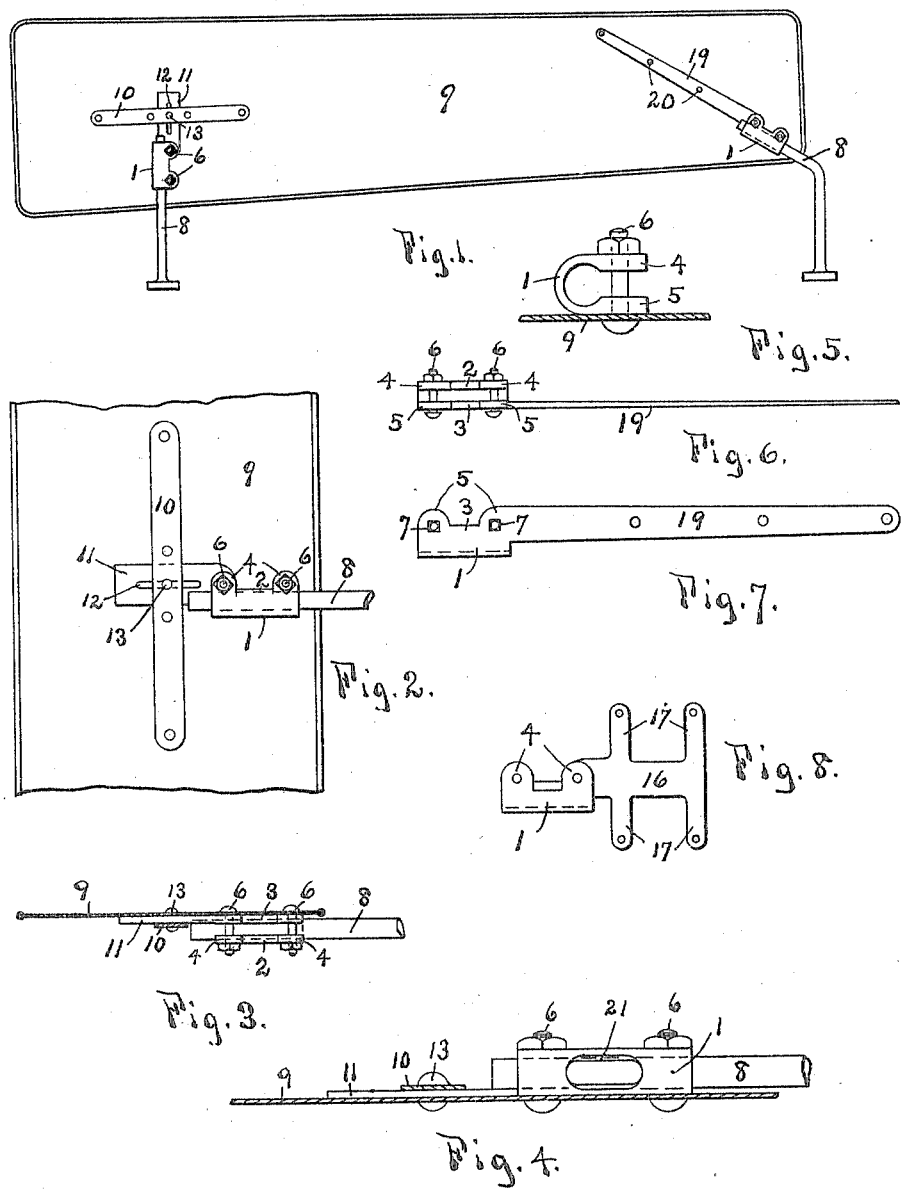

UNITED STATES PATENT OFFICE.

BERT E. THOMPSON, OF DETROIT, MICHIGAN, ASSIGNOR TO HAYES MANUFACTURING COMPANY, OF DETROIT, MICHIGAN, A CORPORATION OF MICHIGAN.

FASTENER FOR FENDERS.

No. 817,204.   Specification of Letters Patent.   Patented April 10, 1906.

Application filed July 22, 1905. Serial No. 270,890.

*To all whom it may concern:*

Be it known that I, BERT E. THOMPSON, a citizen of the United States, and a resident of Detroit, in the county of Wayne and State of Michigan, have invented a new and useful Fastener for Fenders, of which the following is a specification.

This invention relates to fastenings for attaching fenders, such as mud and dust guards for vehicles, to the forged-steel arms and brackets that support the same; and the objects of my improvements are to provide a fastener for this purpose that shall be adjustable on the supporting-arm, that shall be easily attachable and detachable, that shall be easily adjustable, and that shall be of maximum strength with minimum weight. I attain these objects by the construction illustrated in the accompanying drawings, in which—

Figure 1 is a view of the lower side of a vehicle mud-guard with two forms of my improved fastener securing the guard to its brackets. Fig. 2 is an enlarged detail of one of the forms. Fig. 3 is an edge view of the same, the guard being shown in section. Fig. 4 is an enlarged detail of this fastener. Fig. 5 shows the socket end of the fastener. Fig. 6 is a side view, and Fig. 7 a bottom view, of a modified form of the fastener. Fig. 8 is still another modified form of the fastener.

Similar reference characters refer to like parts throughout the several views.

Mud and dust guards are usually made of thin sheet metal, and in many cases these fenders, as in automobiles, are subjected to great vibratory stresses, causing them to break at the point of attachment to the supporting-frames. The fasteners shown in the drawings provide for large areas of contact between the fasteners and the fenders and also provide for great rigidity of engagement between the fasteners and the brackets, which, as in this case, are, as a rule, round rods having flanges or enlargements at their ends where they are attached to the vehicle. The great variety and difference in construction of automobiles and the narrow limits within which fenders may vary renders it a matter of prime importance that the forms of fasteners used shall be such as to render them easily adjustable on the supporting-brackets.

In the drawings the fender shown is in the form of the well-known mud-guard for automobile-wheels. The supports shown are round irons having fastening-flanges forged upon the outer ends of the same. The fastener comprises principally a socket to receive the end of the round iron and a plate to be secured to the guard. The socket 1 of the different forms of fastener is split, and the two lips 2 and 3 have lugs 4 and 5, through which the bolts 6 extend. The lugs 5 have square holes 7, so as to hold the square upper ends of the bolts 6 from turning. The bolts extend through the guard and assist greatly to hold the guard and fastener together. As the socket is of good length, the engagement between it and the rod end 8 will be very rigid.

Extending along the middle of the guard 9 is a flat metal strengthening-strap 10, secured to the guard at any desired number of points. To the socket 1 is attached a flat plate 11, provided with a slot 12, through which the rivet 13 in the middle of the strap 10 passes. The advantage of this construction is that while the strap 10 can always be secured along the center line of the guard and the fastener near the edge the plate 11 will always be under the strap 10 and the rivet 13 will always pass through both the strap and plate and secure all parts together.

Where standard sizes of automobiles and guards are made in large numbers, there is little necessity for making the fastener adjustable. I therefore find the fastener shown in Fig. 8 of value. In this the fastening-plate is replaced by a plate 16, having four extending arms 17, through the ends of which rivets will extend, which, together with the bolts 6, will serve to hold all parts firmly in place.

In the modified form shown in Figs. 6 and 7 the plate 19 is of considerable length and is adapted to support the front end of guards for heavy automobiles. The socket is adjustable on the rod 8, as before, and the rivets 20 and bolts 6 are sufficient to withstand the stresses to which this fastening is subjected.

When guards having these fasteners are to be shipped, there is no difficulty in removing the brackets, and the fasteners themselves occupy little space, so that the guards may be closely crated.

Having now explained my improvements, what I claim as my invention, and desire to secure by Letters Patent, is—

1. The combination with a fender and an arm to support the same, of a fastener comprising a socket lying flat against said fender and split longitudinally on one side, lugs projecting from the edges of the split side of said socket, bolts extending through said fender and said lugs and adapted to clamp the socket securely on said arm when the engaged end of said arm is parallel to the fender, and a projecting plate on said socket adapted to be secured to said fender.

2. The combination with a fender and an arm to support the same, of a longitudinally-split metal socket adapted to receive the end of said arm and lying flat against the fender, pairs of lugs projecting from the edges of the split side of the socket, a plate projecting from said socket and adapted to be secured to the fender, and bolts passing through said lugs and adapted to secure the fastener, arm and fender together.

3. The combination with a fender, of an arm to support the same, a fastener to secure the fender on said arm and comprising a U-shaped socket lying flat against the fender, a plate whereby said socket may be secured to said fender, bolts to clamp the socket onto the arm, and a stiffening device secured to the fender and fitting over said plate, said plate being provided with a slot to permit adjustment.

4. The combination of a fender, of a fastening device comprising a plate secured flat against the fender, said plate having an extension bent upward and back parallel to the plate to form a U-shaped socket, a supporting-arm for the fender adapted to rest within the socket, and bolts passing through the fender, plate and projecting extension of the plate and adapted to secure the fender, arm and fastener together.

In testimony whereof I have signed my name to this specification in the presence of two subscribing witnesses.

BERT E. THOMPSON.

Witnesses:
EDWARD N. PAGELSEN,
H. JAY HAYES.